(12) United States Patent
Ko et al.

(10) Patent No.: US 7,948,578 B2
(45) Date of Patent: May 24, 2011

(54) LIQUID CRYSTAL DISPLAY DEVICE AND METHOD OF MANUFACTURING THE SAME

(75) Inventors: Kyung-Rok Ko, Suwon-si (KR); Sang-Chul Lee, Gyeonggi-do (KR); Won-Ju Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 257 days.

(21) Appl. No.: 12/265,333

(22) Filed: Nov. 5, 2008

(65) Prior Publication Data

US 2009/0122220 A1    May 14, 2009

(30) Foreign Application Priority Data

Nov. 7, 2007   (KR) ............................... 2007-113163

(51) Int. Cl.
*G02F 1/1333* (2006.01)
*H01L 21/00* (2006.01)

(52) U.S. Cl. ............. 349/58; 349/56; 349/187; 445/24; 438/30

(58) Field of Classification Search .................... 349/58, 349/56, 187, 60; 438/30; 445/24
See application file for complete search history.

(56) References Cited

U.S. PATENT DOCUMENTS

| | | | |
|---|---|---|---|
| 7,280,367 B2 * | 10/2007 | Park et al. | 361/753 |
| 2005/0243526 A1 * | 11/2005 | Park et al. | 361/753 |
| 2008/0048958 A1 * | 2/2008 | Kim et al. | 345/87 |
| 2008/0174715 A1 * | 7/2008 | Suh et al. | 349/60 |
| 2009/0122220 A1 * | 5/2009 | Ko et al. | 349/58 |

* cited by examiner

*Primary Examiner* — Brian M Healy
(74) *Attorney, Agent, or Firm* — F. Chau & Associates, LLC

(57) ABSTRACT

An LCD device includes an LCD panel for displaying images, a printed circuit board connected to one side of the LCD panel and supplying a driving signal to the LCD panel, and including a connection hole, a bottom chassis and a middle mold receiving the LCD panel, and a top chassis protecting the LCD panel and the middle mold, wherein the bottom chassis includes a hook fixing the source PCB.

18 Claims, 13 Drawing Sheets

LIQUID CRYSTAL DISPLAY DEVICE AND METHOD OF MANUFACTURING THE SAME

CROSS-REFERENCE TO RELATED PATENT APPLICATION

This application claims priority to Korean Patent Application No. 2007-113163, filed on Nov. 7, 2007, the contents of which are herein incorporated by reference in their entirety.

BACKGROUND OF THE INVENTION

1. Technical Field

The present disclosure relates to a liquid crystal display ("LCD") device having improved durability against external impacts, and a method of manufacturing the LCD device.

2. Discussion of Related Art

Recently, the advent the information society has led to increased importance of a liquid crystal display ("LCD") device. An LCD device has advantages, such as a smaller size, lighter weight, and lower power consumption, when compared with a cathode ray tube ("CRT") display.

The LCD device typically includes an LCD panel, a panel driver, a backlight assembly, a bottom chassis, a middle mold, and a top chassis.

The LCD panel displaying images includes liquid crystal cells arranged in a matrix form between two substrates, and thin film transistors ("TFTs") controlling signals that are supplied to the liquid crystal cells.

The panel driver includes a driving integrated circuit ("IC") to drive gate and data lines of the LCD panel, a timing controller controlling the driving IC, a power voltage supply supplying voltage signals to the LCD panel and driving circuits. Components of the timing controller and the power voltage supply are mounted on a printed circuit board ("PCB") to supply data signals to the LCD panel.

The backlight assembly includes lamps generating light, a reflective sheet and an optical sheet improving light efficiency. The backlight assembly includes a bottom chassis receiving the backlight assembly and the LCD panel, and a middle mold protecting the backlight assembly and the LCD panel.

The PCB is connected to the LCD panel through a tape carrier package ("TCP"). The PCB is arranged in a side surface of the bottom chassis, with the middle mold disposed therebetween, to be fixed by a source fixing boss formed in the middle mold. The top chassis is coupled to the bottom chassis to prevent the movement of inner components.

However, a conventional PCB is released from the source fixing boss by external impacts, thereby causing a problem such as short circuits between the top chassis and the inner components mounted on the PCB.

SUMMARY OF THE INVENTION

Exemplary embodiments of the present invention provide a liquid crystal display ("LCD") device that can firmly hold a printed circuit board, thereby improving its durability against external impacts.

In an exemplary embodiment, an LCD device includes an LCD panel displaying images, a printed circuit board (PCB) connected to one side of the LCD panel to supply a driving signal to the LCD panel, the PCB including a connection hole, a bottom chassis, and a middle mold receiving the LCD panel, and a top chassis protecting the LCD panel and the middle mold, wherein the bottom chassis comprises a hook fixing the source PCB.

The book may be curved outwardly from the bottom chassis.

The hook may include a supporting portion allowing the PCB to be spaced apart from the bottom chassis with a predetermined distance, and a link portion preventing the PCB from being separated from the bottom chassis. The PCB may be arranged between the supporting portion and the link portion.

The link portion may be extended downwardly to be hooked into the connection hole.

The link portion may allow the PCB to be spaced from the top chassis.

The connection hole may include a ground portion formed in a circumference of the connection hole, and the ground portion contacts the hook when the hook is coupled to the connection hole.

The bottom chassis may include a user hole through which the bottom chassis is coupled to a covering case, and the PCB has a hole overlapping the user hole so that it is externally exposed.

In an exemplary embodiment, an LCD device includes a liquid crystal display panel displaying images, a PCB connected to one side of the LCD panel and supplying a driving signal to the LCD panel, and a bottom chassis and a middle mold receiving the liquid crystal display panel. The middle mold may include a hook for fixing the PCB.

The hook may be separated from the middle mold so as to have elasticity.

The fixing projection may allow the PCB to maintain a predetermined distance from the top chassis.

In an exemplary embodiment, a method of manufacturing an LCD device includes providing an LCD panel, providing a printed circuit board (PCB) to drive the liquid crystal display (LCD) panel, the PCB including a connection hole, connecting the PCB to the LCD panel, providing a bottom chassis including a hook to fix the PCB, mounting the LCD panel on the bottom chassis; and coupling the connection hole to the hook.

The connection hole may be coupled to the hook by a sliding operation.

The hook may include a supporting portion through which the PCB is spaced apart from the bottom chassis, and a link portion preventing the PCB from being separated from the bottom chassis.

In an exemplary embodiment, a method of manufacturing an LCD device includes providing an LCD panel, providing a printed circuit board (PCB) driving the LCD panel, connecting the PCB to the LCD panel, providing a middle mold including a hook to fix the PCB, mounting the LCD panel on the middle mold, and coupling the PCB to the hook.

The PCB may be coupled to the hook by a sliding operation.

The hook may include an inner side on which printed circuit board is seated and a fixing projection preventing the PCB from being separated from the inner side.

The hook may be separated from the middle mold so as to have elasticity.

BRIEF DESCRIPTION OF THE DRAWINGS

Exemplary embodiments of the present invention will be more clearly understood from the following detailed descriptions taken in conjunction with the accompanying drawings, in which.

DETAILED DESCRIPTION OF EXEMPLARY EMBODIMENTS hereinafter, exemplary embodiments of the present invention will be described with reference to FIGS. 1 to 5E. This invention may, however, be embodied in many different forms and should not be construed as limited to the exemplary embodiments set forth herein.

Figure 1:
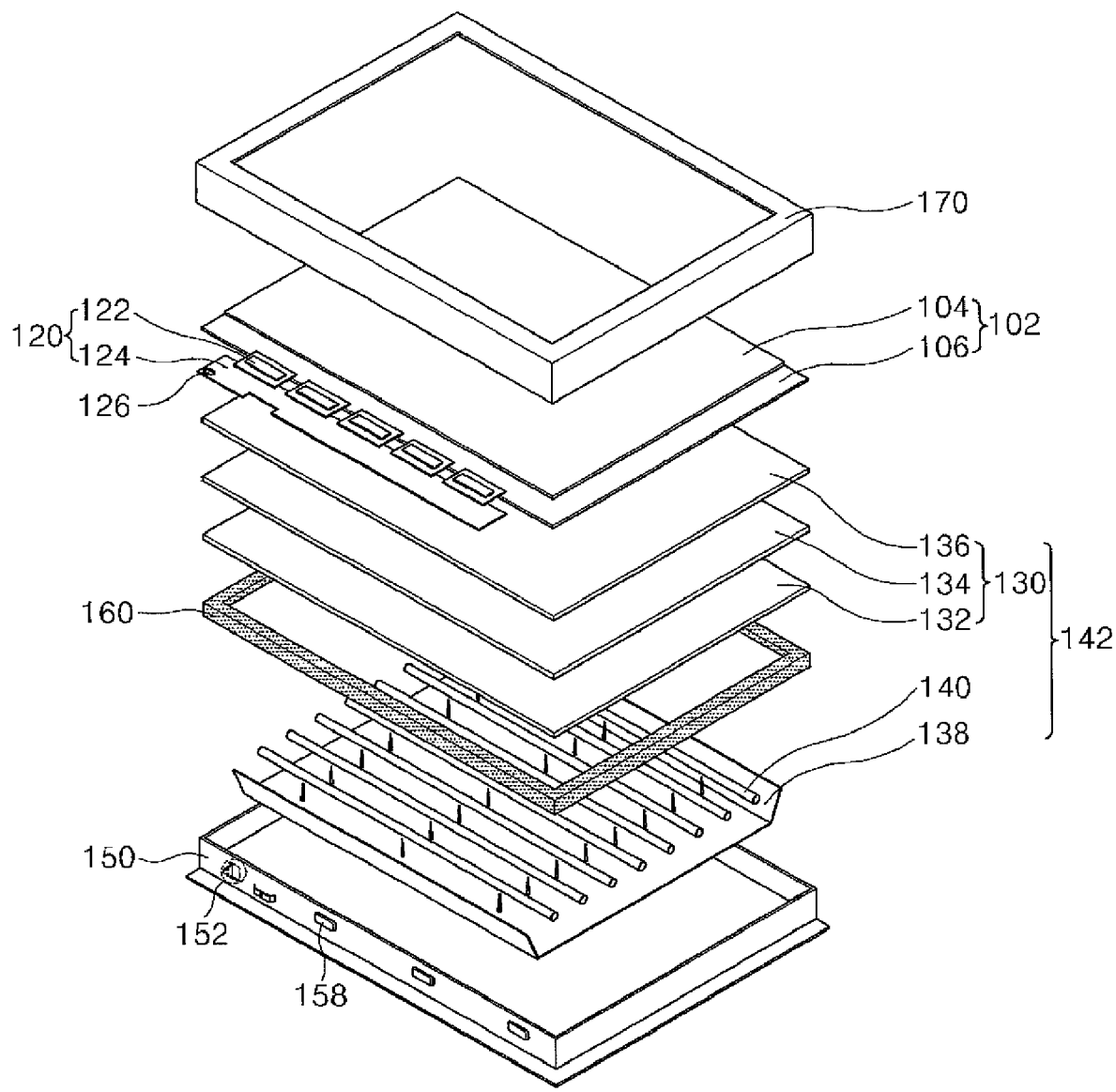
FIG. 1 is a perspective view illustrating a liquid crystal display ("LCD") device in accordance with an exemplary embodiment of the present invention.

FIG. 1 is a perspective view illustrating a liquid crystal display ("LCD") device in accordance with an exemplary embodiment of the invention.

An LCD device 100 includes an LCD panel 102, a panel driver (not shown), a backlight assembly 142, a bottom chassis 150, a middle mold 160, and a top chassis 170.

The LCD panel 102 includes a thin film transistor ("TFT") substrate 106 and a color filter substrate 104. The TFT substrate 106 is attached to face the color substrate 104, with a liquid crystal layer (not shown) sandwiched therebetween to control the light transmissivity. The color filter substrate 104 includes black matrixes (not shown) to prevent light leakage, color filters (not shown) to implement colors, and common electrodes (not shown).

The TFT substrate 106 includes data and gate lines (not shown) formed to intersect each other, TFTs (not shown) formed at intersection portions of the data and gate lines, and pixel electrodes (not shown) connected to the TFTs.

The panel driver includes a gate driver (not shown) to drive gate lines of the LCD panel 102 and a data driver 120 to drive data lines of the LCD panel 102.

The gate driver (not shown) may include a gate printed circuit board ("PCB"), and a gate integrated circuit ("IC") mounted on a gate tape carrier package ("TCB") formed between the gate PCB and the TFT substrate 106.

The gate IC receives a control signal and a power signal from a timing controller and a power voltage supply that are mounted on a source PCB 124.

The data driver 120 includes the source PCB 124 and a data IC 122 mounted on a data TCB formed between the source PCB 124 and the TFT substrate 106.

The data IC 122 converts pixel data into an analog pixel signal and supplies the analog pixel signal to the data lines. The source PCB 124 supplies the control signal, the power signal, and the pixel data supplied from the timing controller and the power supply and the like to the data IC 122.

The backlight assembly 142 includes lamps 140, a reflective sheet 138, and optical sheets 130. The lamps 140 generate light using an external power to supply the light to the LCD panel 102.

The reflective sheet 138 is arranged under the lamps 140 to reflect the light back toward the LCD panel 102.

The optical sheets 130 are sequentially stacked on the lamps 140 and include a diffusion sheet 132, a prism sheet 134, and a protection sheet 136. The diffusion sheet 132 diffuses the light. The prism sheet 134 allows the incident light to be directed to the LCD panel 102, so that the light can be concentrated on the LCD panel 102. The protective sheet 136 protects a surface of the prism sheet 134. The diffusion sheet 132, prism sheet 134, and protection sheet 136, respectively, may be provided in multiple units.

The bottom chassis 150 includes a hook 152 to fix the source PCB 124 and an embossed portion 158 to support the source PCB 124. A connection hole 126 is formed at one side of the source PCB 124 to be coupled to the hook 152.

The bottom chassis 150 receives the backlight assembly 142, the middle mold 160, and the LCD panel 102. The middle mold 160 wraps around an outer surface of the bottom chassis 150, and the LCD panel 102 is seated on an upper side of the middle mold 160.

The middle mold 160 is arranged between the bottom chassis 150 and the top chassis 170 so as to surround the bottom chassis 150. A height of the middle mold 160 may be shorter than a height of the bottom chassis 150 so that the hook 152 is not covered by the middle mold 160. A structure of the middle mold 160, a structure of the bottom chassis 160, and a combination of the source PCB 124 with the middle mold 160 and bottom chassis 160 will be described in detail with reference to FIG. 4.

The top chassis 170 surrounds the edge of the LCD panel 102 and is coupled to an outer side surface of the middle mold 160 that is coupled to the outer surface of the bottom chassis 150. The top chassis 170 prevents the movement of inner components and protects the edge of the LCD panel 102.

Figure 2A:
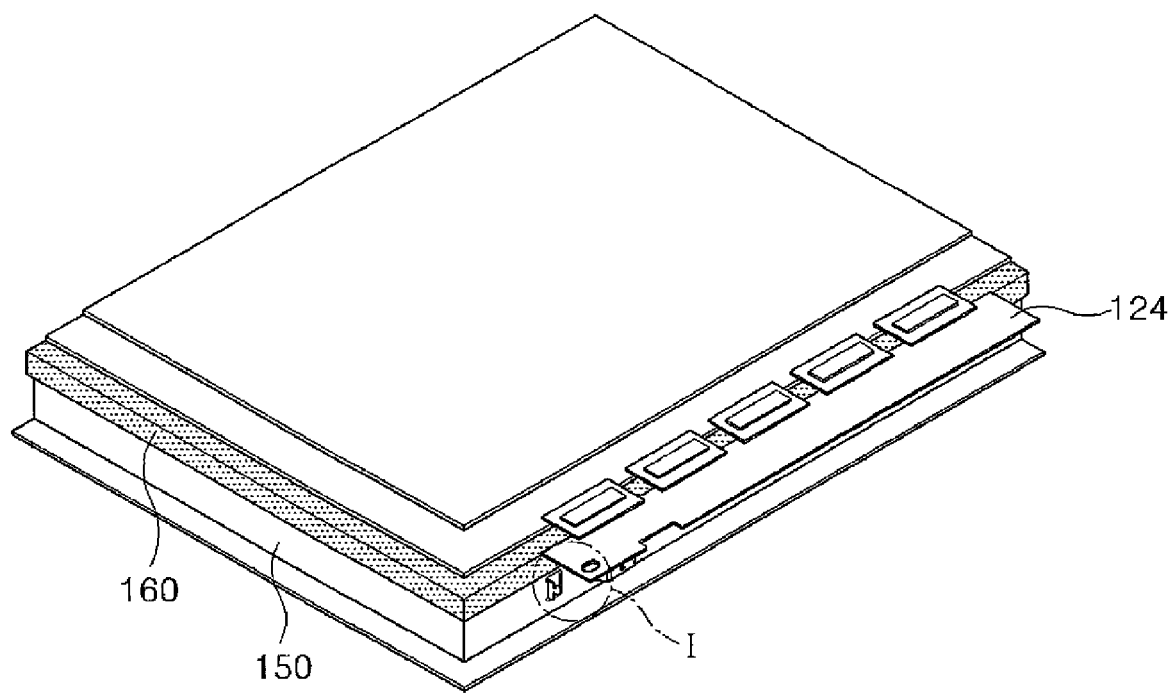
FIG. 2A is a perspective view illustrating a combination of a source printed circuit board ("PCB") and a hook in accordance with an exemplary embodiment of the present invention.
Figure 2B:
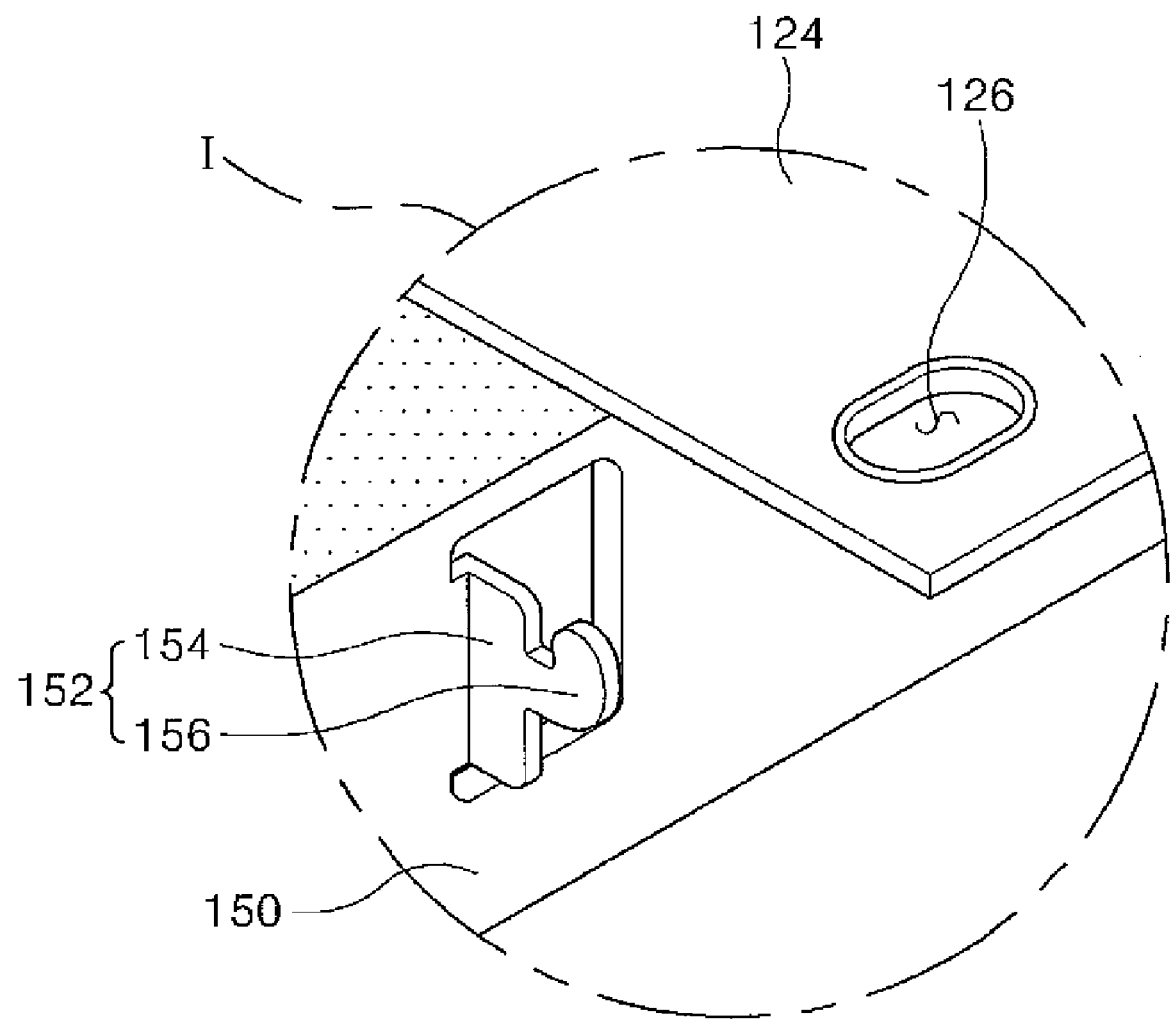
FIG. 2B is a partial enlarged view of a portion I in FIG. 2A.
Figure 2C:
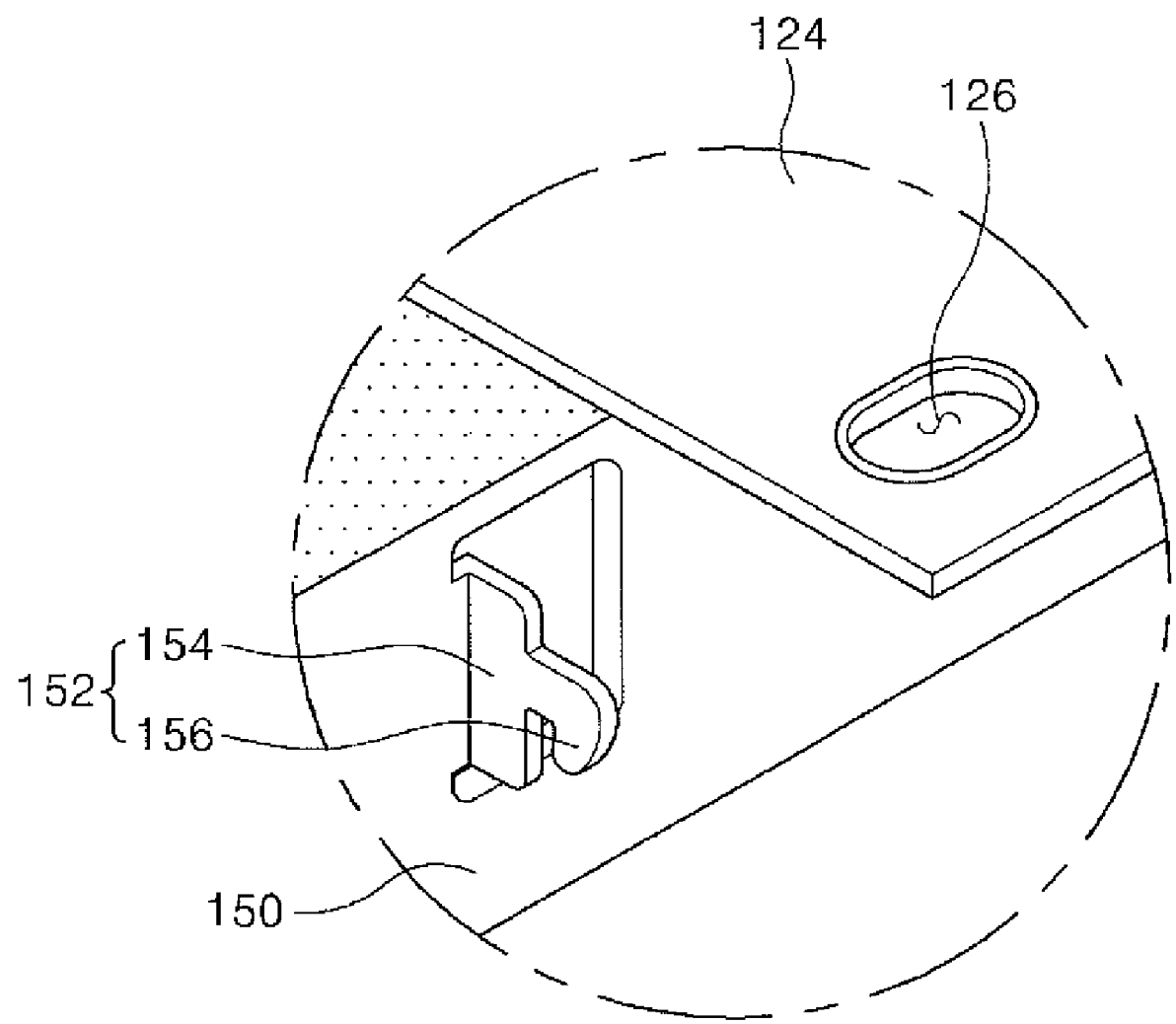
FIG. 2C is a partial enlarged view illustrating a variation to FIG. 2B.

FIG. 2A is a perspective view illustrating a connection of the source PCB and the hook in accordance with the exemplary embodiment described above, FIG. 2B is a partial enlarged view of a portion I in FIG. 2A, and FIG. 2C is a partial enlarged view of a variation to FIG. 2B.

The bottom chassis 150 includes the hook 152, instead of a fixing boss included in a conventional source PCB, to fix the source PCB 124. As shown in FIG. 2B, the hook 152 is extended and curved outwardly from the bottom chassis 150. The hook 152 is coupled to the connection hole 126 of the source PCB 124. The hook 152 includes a supporting portion 154 serving to keep the bottom chassis 150 apart from the source PCB 124, and a link portion 156 preventing the source PCB 124 from being separated from the bottom chassis 150. The source PCB 124 is fixed between the supporting portion 154 and the link portion 156.

The link portion 156 may formed in a round shape to be easily coupled to the connection hole 126 of the source PCB 124. As shown in FIG. 2B, the link portion 156 is extended upwardly to be hooked into the connection hole 126. In an alternate exemplary embodiment to that shown in FIG. 2C, the link portion 156 is extended downwardly to be hooked into the connection hole 126.

Figure 3A:
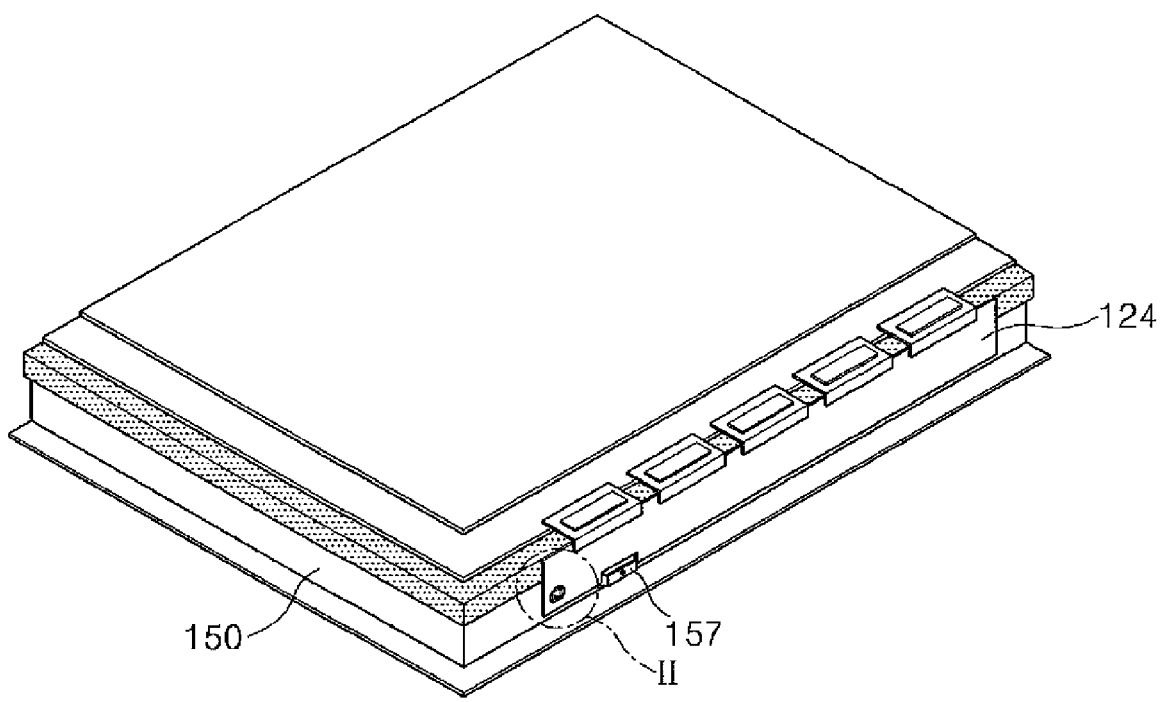
FIG. 3A is a perspective view illustrating a coupled structure of the source PCB and the hook in accordance with an exemplary embodiment of the present invention.
Figure 3B:
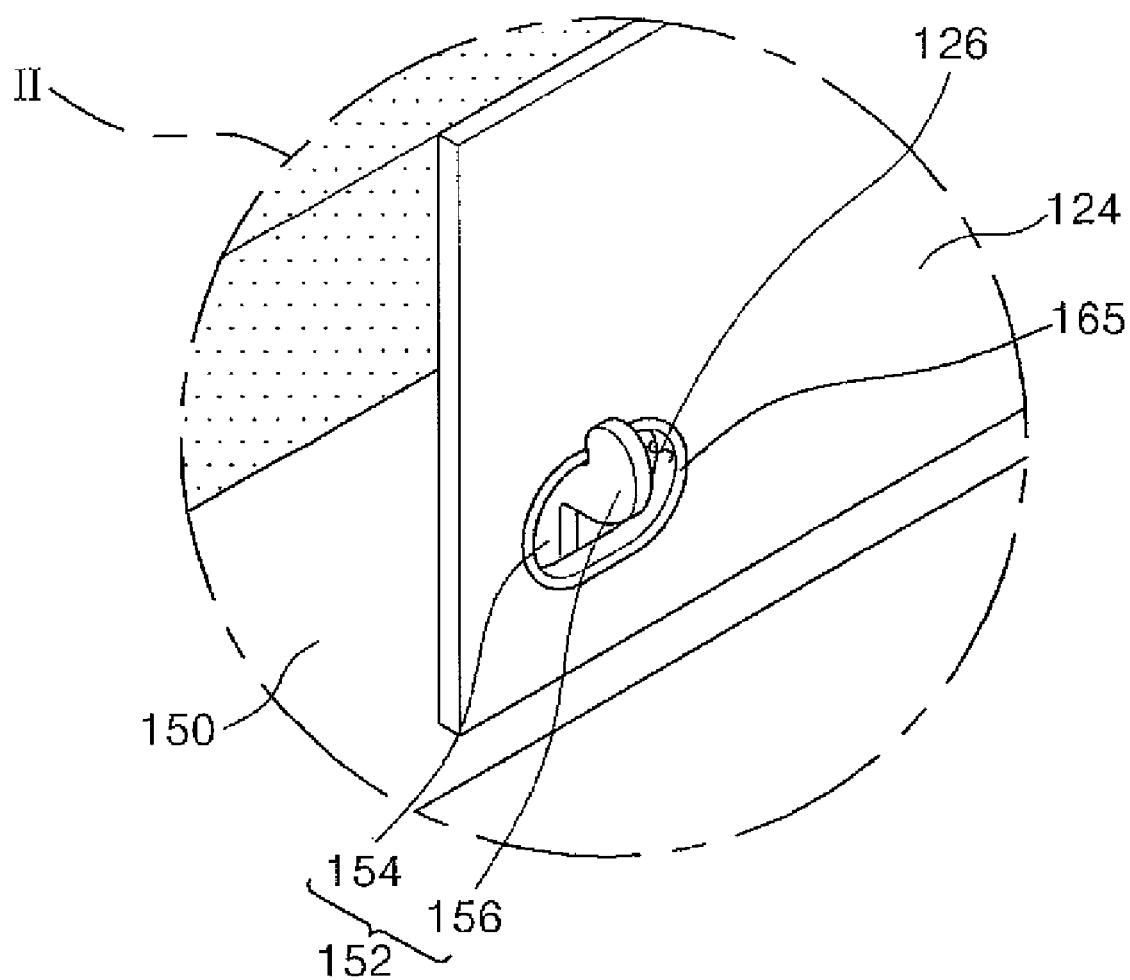
FIG. 3B is a partial enlarged view of a portion II in FIG. 3A.
Figure 3C:
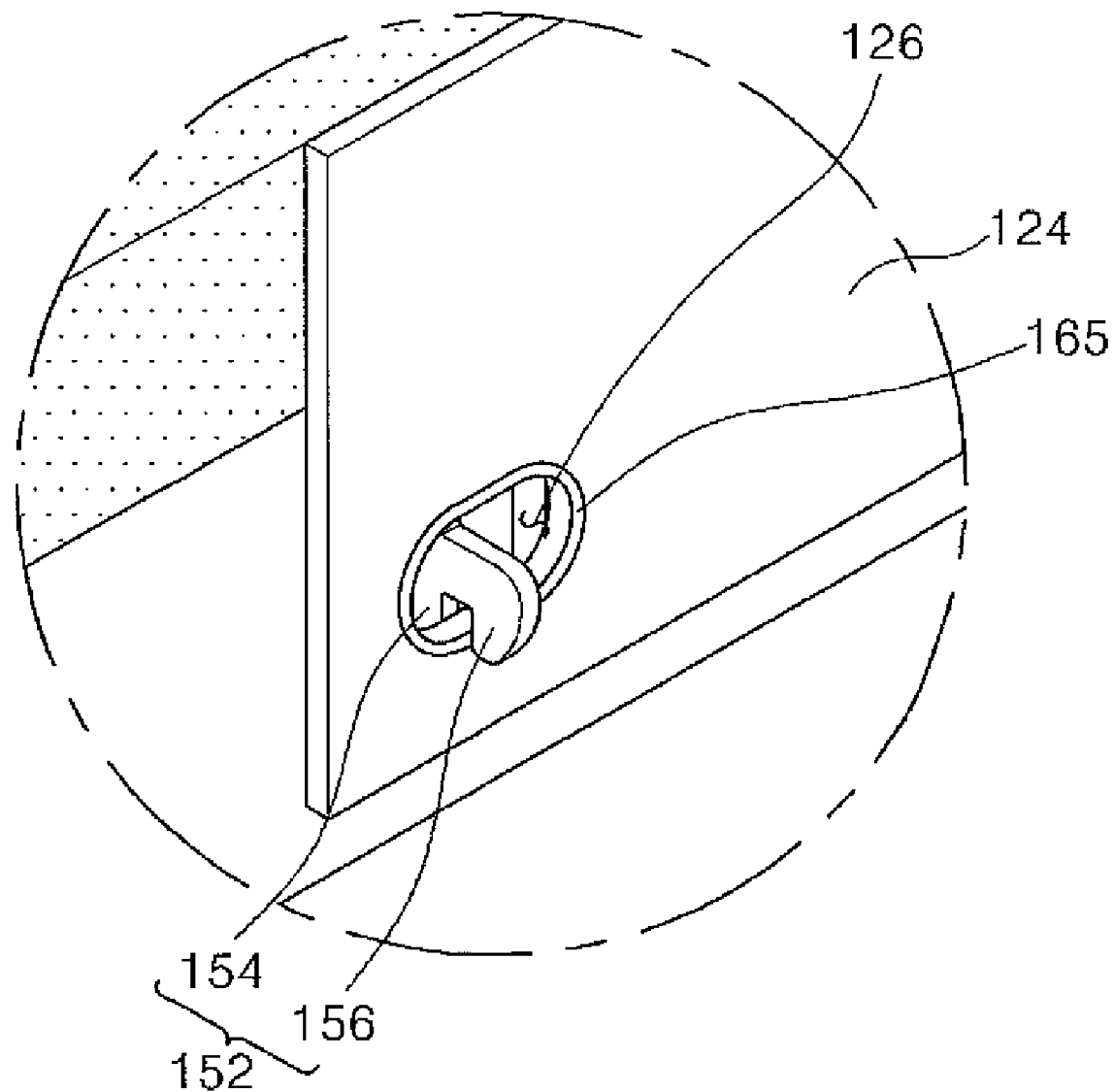
FIG. 3C is a partial enlarged view illustrating a variation to FIG. 3B.

FIG. 3A is a perspective view illustrating a coupled structure of the source PCB and the hook in accordance with the above-described exemplary embodiment of the present invention, FIG. 3B is a partial enlarged view of a portion II in FIG. 3A, and FIG. 3C is a partial enlarged view illustrating a variation to FIG. 3B.

The link portion 156 may enter into and be hooked by the connection hole 126, because the link portion 156 is rounded upwardly or downwardly in its tip, as shown in FIG. 3B and FIG. 3C, respectively. The tip of the link portion 156 extending upwardly serves to make the source PCB 124 be apart from the top chassis, thereby preventing a possible short circuit between the top chassis and chips mounted on the source PCB 124.

A beveled portion 165 is formed in a circumference of the connection hole 126. The beveled portion 165 contacts the hook 152 when the connection hole 126 is coupled to the hook 152. The beveled portion 165 may be formed by grinding.

As shown in FIG. 3A, the bottom chassis 150 includes a user hole 157 through which the bottom chassis 150 is coupled to a covering case (not shown). The source PCB 124 has a hole formed therein in a portion overlapping the user hole 157, so as to expose the user hole 157.

The source PCB 124 is firmly held by the supporting portion 154 and the link portion 156, thereby preventing the source PCB 124 from being separated from the bottom chassis 150.

Figure 4:
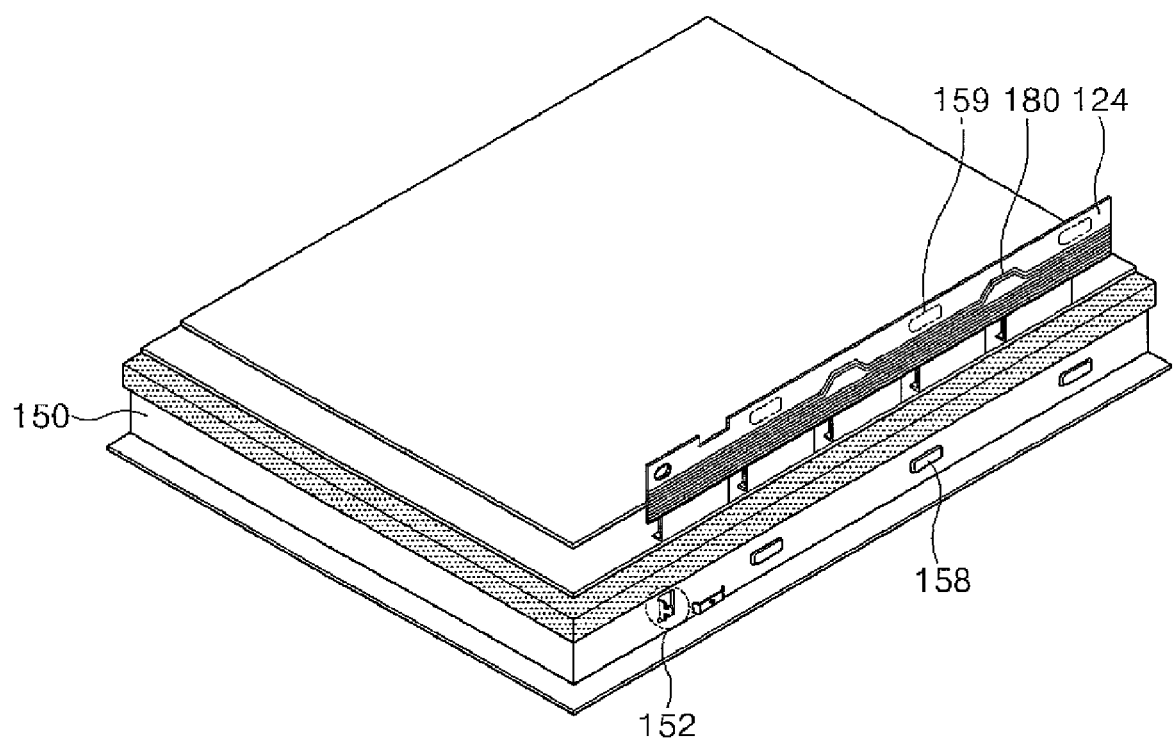
FIG. 4 is a perspective view for explaining a relation of an embossed portion of a bottom chassis and data wires of the PCB in accordance with an exemplary embodiment of the invention.

FIG. 4 is a perspective view illustrating a relationship of an embossed portion of the bottom chassis and data wires of the source PCB in accordance with an exemplary embodiment of the invention.

The bottom chassis 150 includes the hook 152 fixing and supporting the source PCB 124 and the embossed portion 158 supporting the source PCB 124. The embossed portion 158 is formed in an oval shape with a specified height, so that the source PCB 124 and the bottom chassis 150 can be spaced by a predetermined distance.

The data wires 180 formed on a rear surface of the source PCB 124 are designed to avoid contact with the embossed portion 158 of the bottom chassis 150. When the source PCB 124 is coupled to the bottom chassis 150 through the hook 152, the embossed portion 158 of the bottom chassis 150 contacts an embossed portion contact area 159 formed on the rear surface of the source PCB 124. The embossed portion 158 of the bottom chassis 150 does not contact the data wires 180. Accordingly, the LCD device does not need to add an additional insulation component between the source PCB 124 and the bottom chassis 150.

A method of manufacturing an LCD device in accordance with an exemplary embodiment includes providing an LCD panel, providing a source PCB to drive the LCD, which includes a connection hole, and driving the LCD panel, connecting the source PCB to the LCD panel, providing a bottom chassis including a hook to fix the source PCB, mounting the LCD panel on the bottom chassis, and coupling the hook to the connection hole.

The hook may include a supporting portion allowing the source PCB to be spaced apart from the bottom chassis by a predetermined distance, and a hook preventing the source PCB from being separated from the bottom chassis. The hook may be coupled to the connection hole in such a manner that the connection hole slides along the rounded tip of the hook and is captured by the hook, that is, by a sliding operation.

Figure 5A:
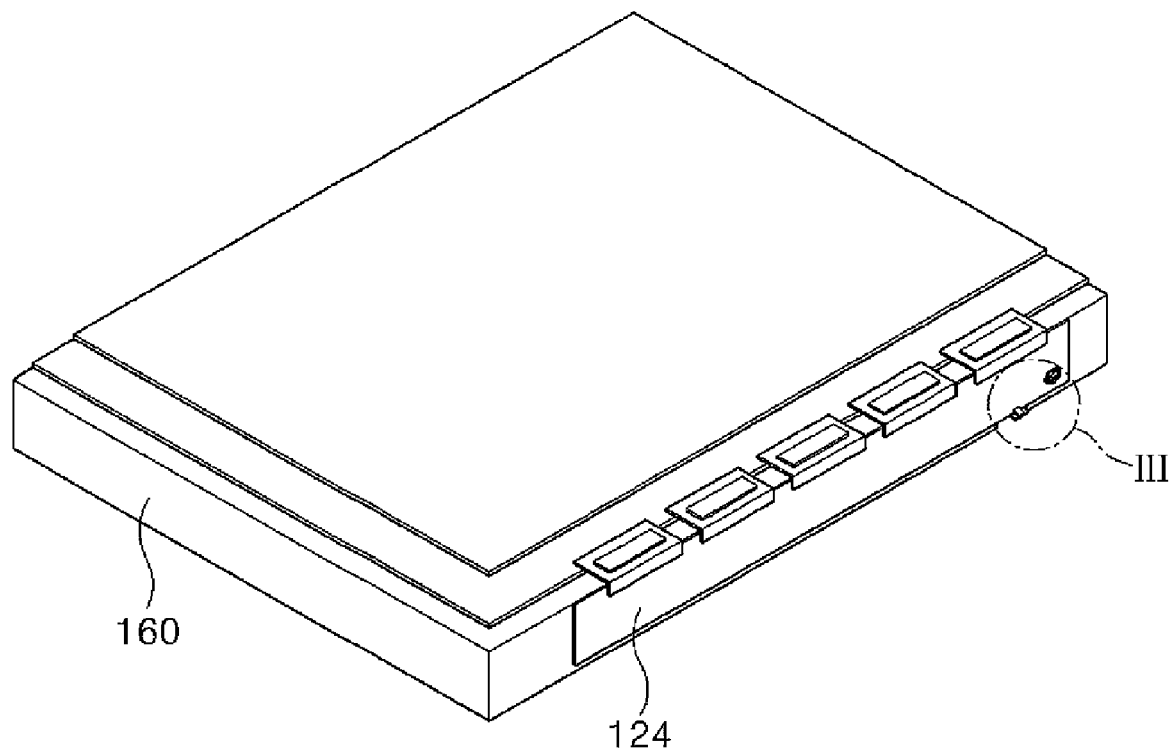
FIG. 5A is a perspective view illustrating a combination of a source PCB and a middle mold in accordance with an exemplary embodiment of the present.
Figure 5B:
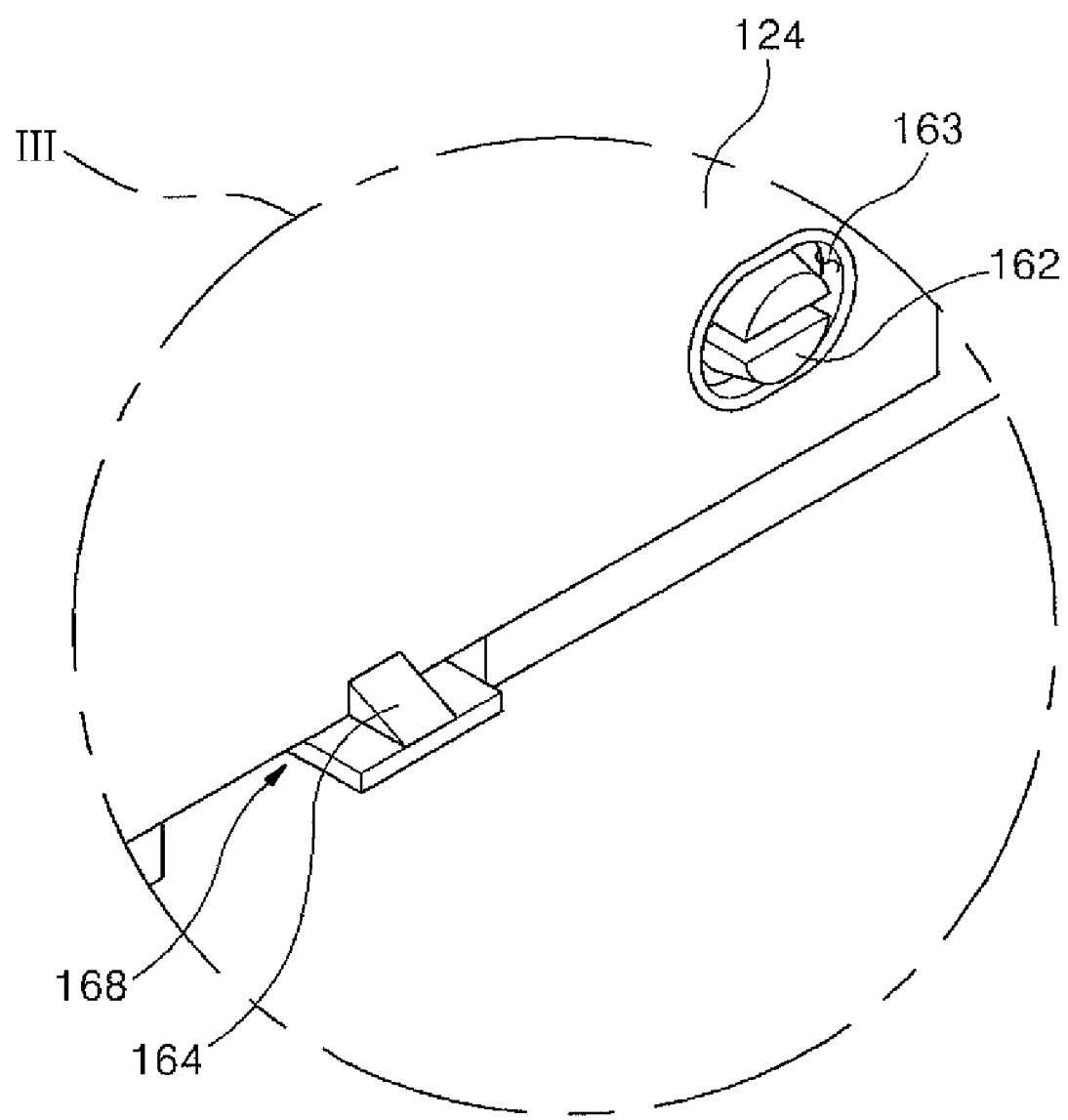
FIG. 5B is a partial enlarged view of a portion III in FIG. 5A.
Figure 5C:
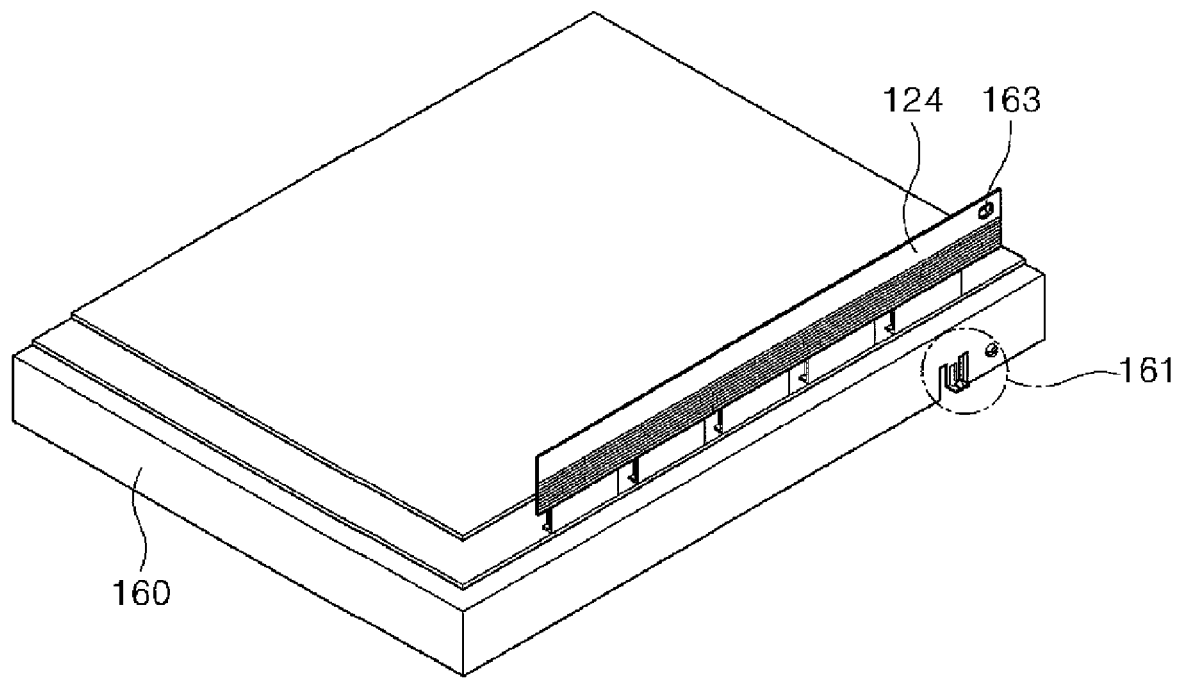
FIG. 5C is a perspective view illustrating a fixing portion of the middle mold.
Figure 5D:
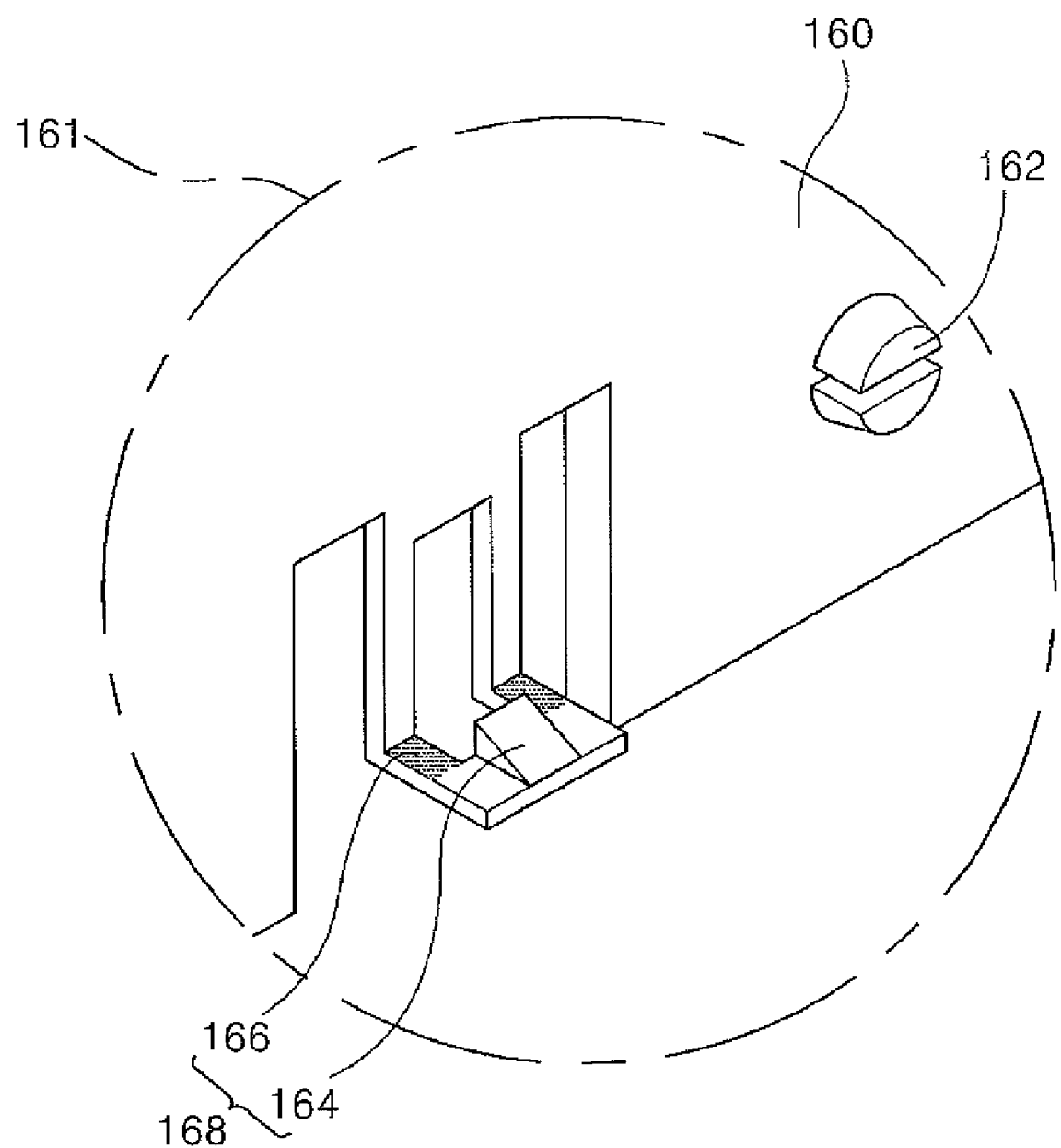
FIG. 5D is a partial enlarged view of the fixing portion in FIG. 5C.

The FIG. 5A is a perspective view illustrating a connection of the middle mold and the source PCB in accordance with an exemplary embodiment of the present invention, and FIG. 5B is a partial enlarged view of a portion III in FIG. 5A. FIG. 5C is a perspective view illustrating a fixing portion of the middle mold, and FIG. 5D is a partial enlarged view of the fixing portion in FIG. 5C. The components other than the components fixing the middle mold and the source PCB are the same as those of the above-described exemplary embodiment of the invention, and thus the detailed description thereof will be omitted.

A fixing portion 161 shown in FIGS. 5C and 5D includes a hook 168 and a fixing boss 162 to fix the source PCB 124. The fixing boss 162 protrudes from one side of the middle mold 160 and is coupled to a boss hole 163 of the source PCB 124. The hook 168 is formed on a lower portion of the middle mold 160, and includes an inner side 166 and a fixing projection 164. The hook 168 is made of the same material as that of the fixing projection 164 and the middle mold 160. As shown in FIG. 5D, a part of the inner side 166 where the source PCB 124 is seated is represented by shade lines. The source PCB 124 is seated on the inner side 166 and is prevented from being separated from the inner side 166 by the fixing projection 164. A portion of the fixing projection 164, which protrudes toward the top chassis (not shown), serves to maintain a predetermined distance between the source PCB 124 and the bottom chassis to eliminate any necessity of an additional component.

Figure 5E:
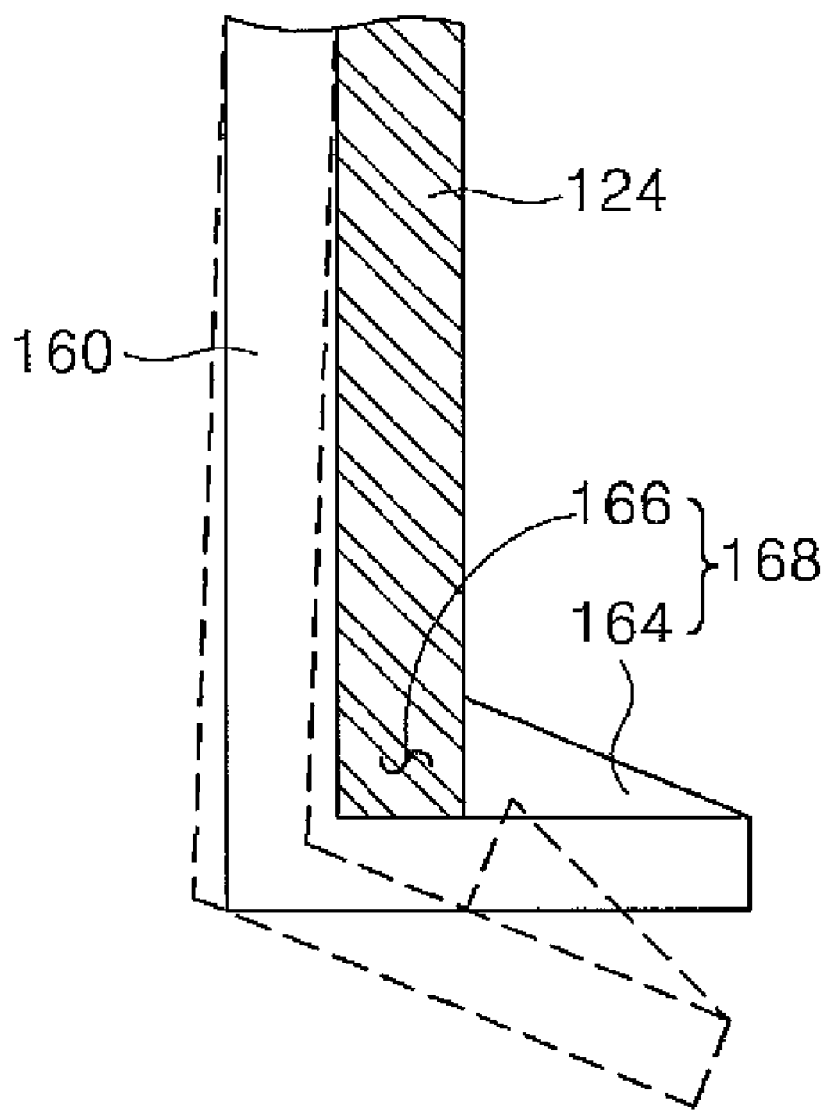
FIG. 5E is a cross-sectional view illustrating a combination of the source PCB and the middle mold.

FIG. 5E is a cross-sectional view useful in illustrating a method of combining the source PCB and the middle mold.

When the middle mold 160 is coupled with the source PCB 124, the hook 168 is pressed downward by the source PCB 124, and, after the coupling is complete, the hook 168 returns to its original location by its inherent elasticity. Then, the bottom surface of the source PCB 124 is seated on the inner side 166, and the source PCB 124 can be engaged with the middle mold 160. Therefore, the source PCB 124 can be prevented from being separated from the inner side 166 by the fixing projection 164.

A method of manufacturing the LCD device in accordance with an exemplary embodiment includes providing the LCD panel, providing the source PCB 124 to drive the LCD panel, providing the middle mold 160 including the hook 168 to fix the source PCB 124, mounting the LCD panel on the middle mold 160, and coupling the source PCB 124 to the hook 168.

The hook 168 includes the inner side 166 on which the source PCB 124 is seated, and the fixing projection 164 preventing the source PCB 124 from being separated from the inner side 166. The hook 168 is separated from the middle mold 160 and has elasticity.

The source PCB 124 may be coupled to the hook 168 in such a manner that the bottom surface of the middle mold 160 slides along the fixing projection 164 while the hook 168 is pressed downward, and is then hooked by the hook 160 which has returned to its original location.

The LCD device in accordance with an exemplary embodiment of the present invention further includes the hook formed in the middle mold as well as a conventional fixing boss. The hook prevents the source PCB from being damaged by external impacts and may prevent a short circuit generated between the top chassis and components mounted on the source PCB.

As described above, the LCD device includes the hook formed in the bottom chassis to firmly fix the source PCB. Also, the embossed portion maintains the predetermined distance between the source PCB and the bottom chassis and is designed to avoid contacting the data wires, so that the additional insulation component is not required.

While the present invention has been shown and described in connection with exemplary embodiments, it will be apparent to those of ordinary skill in the art that modifications and variations can be made without departing from the spirit and scope of the invention, as defined by the appended claims.

What is claimed is:

1. A liquid crystal display (LCD) device comprising:
    a LCD panel for displaying images;
    a printed circuit board (PCB) connected to one side of the LCD panel to supply a driving signal to the LCD panel, the PCB including a connection hole;
    a bottom chassis and a middle mold receiving the LCD panel; and
    a top chassis protecting the LCD panel and the middle mold,
    wherein the bottom chassis includes a hook that is bent from the bottom chassis and coupled with the PCB after passing through the connection hole to the PCB.

2. The liquid crystal display device according to claim 1, wherein the hook comprises:
    a supporting portion through allowing the PCB to be spaced apart from the bottom chassis with a predetermined distance; and
    a link portion preventing the PCB from being separated from the bottom chassis,
    wherein the PCB is arranged between the supporting portion and the link portion.

3. The liquid crystal display device according to claim 2, wherein the link portion is extended upwardly to be hooked into the connection hole.

4. The liquid crystal display device according to claim 2, wherein the link portion is extended downwardly to be hooked into the connection hole.

5. The liquid crystal display device according to claim 2, wherein the link portion causes the PCB to be spaced apart from the top chassis.

6. A liquid crystal display (LCD) device comprising:
    a LCD panel for displaying images;
    a printed circuit board (PCB) connected to one side of the LCD panel to supply a driving signal to the LCD panel, the PCB including a connection hole;
    a bottom chassis and a middle mold receiving the LCD panel; and
    a top chassis protecting the LCD panel and the middle mold,
    wherein the bottom chassis includes a hook that is bent from the bottom chassis and coupled with the PCB after passing through the connection hole to the PCB,
    wherein the connection hole comprises a beveled portion formed in a circumference of the connection hole, and the beveled portion contacts the hook when the hook is coupled to the connection hole.

7. A liquid crystal display (LCD) device comprising:
    a LCD panel for displaying images;
    a printed circuit board (PCB) connected to one side of the LCD panel to supply a driving signal to the LCD panel, the PCB including a connection hole;
    a bottom chassis and a middle mold receiving the LCD panel; and
    a top chassis protecting the LCD panel and the middle mold,
    wherein the bottom chassis includes a hook that is bent from the bottom chassis and coupled with the PCB after passing through the connection hole to the PCB,
    wherein the bottom chassis further comprises an embossed portion through which the bottom chassis is spaced apart from the PCB with a predetermined distance.

8. The liquid crystal display device according to claim 1, wherein the bottom chassis comprises a user hole through which the bottom chassis is coupled to a covering case, and the PCB has a hole overlapping the user hole whereby the user hole is externally exposed.

9. A liquid crystal display (LCD) device comprising:
    a liquid crystal display panel for displaying images;
    a printed circuit board (PCB) connected to one side of the LCD panel and supplying a driving signal to the liquid crystal display panel; and
    a bottom chassis and a middle mold receiving the liquid crystal display panel;
    wherein the middle mold comprises a hook fixing the PCB, and the hook comprises an inner side on which the PCB is seated and a fixing a projection preventing the PCB from being separated from the inner side.

10. The liquid crystal display device according to claim 9, the hook is separated from the middle mold and has elasticity.

11. The liquid crystal display device according to claim 9, wherein the fixing projection allows the PCB to be maintained at a predetermined distance from the top chassis.

12. A method of manufacturing a liquid crystal display (LCD) device comprising:
    providing an LCD panel;
    providing a printed circuit board (PCB) to drive the LCD panel, the PCB including a connection hole;
    connecting the PCB to the LCD panel;
    providing a bottom chassis including a hook to fix the PCB;
    mounting the LCD panel on the bottom chassis; and
    coupling the connection hole to the hook,
    wherein the bottom chassis includes a hook that is bent from the bottom chassis and coupled with the PCB after passing through the connection hole to fix the PCB.

13. The method of claim 12, wherein the connection hole is coupled to the hook by a sliding operation.

14. The method of claim 13, wherein the hook comprises:
    a supporting portion through which the PCB is spaced apart from the bottom chassis; and
    a link portion preventing the PCB from being separated from the bottom chassis.

15. A method of manufacturing a liquid crystal display (LCD) device comprising:
    providing an LCD panel;
    providing a printed circuit board (PCB) driving the LCD panel;
    connecting the PCB to the LCD panel;
    providing a middle mold including a hook to fix the PCB;
    mounting the LCD panel on the middle mold; and
    coupling the PCB to the hook,
    wherein the PCB is coupled to the hook by a sliding operation.

16. The method of claim 15, wherein the hook comprises:
    an inner side on which the printed circuit board is seated; and
    a fixing projection preventing the PCB from being separated from the inner side.

17. The method of claim 16, the hook is separated from the middle mold and has elasticity.

18. The liquid crystal display device according to claim 2, wherein the supporting portion is bent outwardly from the bottom chassis.

* * * * *

UNITED STATES PATENT AND TRADEMARK OFFICE
CERTIFICATE OF CORRECTION

| | | |
|---|---|---|
| PATENT NO. | : 7,948,578 B2 | Page 1 of 1 |
| APPLICATION NO. | : 12/265333 | |
| DATED | : May 24, 2011 | |
| INVENTOR(S) | : Ko et al. | |

It is certified that error appears in the above-identified patent and that said Letters Patent is hereby corrected as shown below:

Claim 9, at column 8, line 18 should read:

"is seated and a fixing projection preventing the PCB"

Signed and Sealed this
Twenty-ninth Day of November, 2011

David J. Kappos
*Director of the United States Patent and Trademark Office*